US 11,960,852 B2

(12) United States Patent
Jia et al.

(10) Patent No.: US 11,960,852 B2
(45) Date of Patent: Apr. 16, 2024

(54) ROBUST DIRECT SPEECH-TO-SPEECH TRANSLATION

(71) Applicant: Google LLC, Mountain View, CA (US)

(72) Inventors: Ye Jia, Mountain View, CA (US); Michelle Tadmor Ramanovich, Mountain View, CA (US); Tal Remez, Mountain View, CA (US); Roi Pomerantz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 68 days.

(21) Appl. No.: 17/644,351

(22) Filed: Dec. 15, 2021

(65) Prior Publication Data

US 2023/0013777 A1 Jan. 19, 2023

Related U.S. Application Data

(60) Provisional application No. 63/203,329, filed on Jul. 16, 2021.

(51) Int. Cl.
*G06F 40/58* (2020.01)
*G10L 13/02* (2013.01)
(Continued)

(52) U.S. Cl.
CPC .............. *G06F 40/58* (2020.01); *G10L 13/02* (2013.01); *G10L 13/10* (2013.01); *G10L 19/16* (2013.01)

(58) Field of Classification Search
CPC ......... G06F 40/58; G06F 40/42; G10L 13/02; G10L 13/10; G10L 19/16; G10L 15/16; G10L 15/26; G10L 13/00
See application file for complete search history.

(56) References Cited

U.S. PATENT DOCUMENTS 11,694,674 B1 * 7/2023 Abbas ..................... G10L 13/08
704/260
2012/0253781 A1 10/2012 Qian et al.
(Continued)

FOREIGN PATENT DOCUMENTS

WO 2020/205233 A1 10/2020

OTHER PUBLICATIONS

Shen, Jonathan, et al. "Natural tts synthesis by conditioning wavenet on mel spectrogram predictions." 2018 IEEE international conference on acoustics, speech and signal processing (ICASSP). IEEE, 2018, pp. 4779-4783 (Year: 2018).*
(Continued)

*Primary Examiner* — Jesse S Pullias
*Assistant Examiner* — Michael C. Lee
(74) *Attorney, Agent, or Firm* — Honigman LLP; Brett A. Krueger; Grant Griffith

(57) ABSTRACT

A direct speech-to-speech translation (S2ST) model includes an encoder configured to receive an input speech representation that to an utterance spoken by a source speaker in a first language and encode the input speech representation into a hidden feature representation. The S2ST model also includes an attention module configured to generate a context vector that attends to the hidden representation encoded by the encoder. The S2ST model also includes a decoder configured to receive the context vector generated by the attention module and predict a phoneme representation that corresponds to a translation of the utterance in a second different language. The S2ST model also includes a synthesizer configured to receive the context vector and the phoneme representation and generate a translated synthesized speech representation that corresponds to a translation of the utterance spoken in the different second language.

18 Claims, 6 Drawing Sheets

(51) Int. Cl.
*G10L 13/10* (2013.01)
*G10L 19/16* (2013.01)

(56) References Cited

U.S. PATENT DOCUMENTS

| | | | | |
|---|---|---|---|---|
| 2022/0020355 | A1* | 1/2022 | Ming | G10L 13/047 |
| 2022/0215832 | A1* | 7/2022 | Ren | G10L 15/16 |
| 2022/0327292 | A1* | 10/2022 | Ruiz Costa-Jussà | G06F 40/47 |
| 2023/0169281 | A1* | 6/2023 | Zheng | G10L 15/16 704/2 |

OTHER PUBLICATIONS

Jia, Ye, et al. "Direct speech-to-speech translation with a sequence-to-sequence model." arXiv preprint arXiv:1904.06037 (Jun. 25, 2019), pp. 1-5 (Year: 2019).*

Yasuda, Yusuke, et al. "Investigation of enhanced Tacotron text-to-speech synthesis systems with self-attention for pitch accent language." ICASSP 2019-2019 IEEE International Conference on Acoustics, Speech and Signal Processing (ICASSP). IEEE, 2019, pp. 6905-6909 (Year: 2019).*

Ren, Yi, et al. "Fastspeech: Fast, robust and controllable text to speech." Advances in neural information processing systems 32 (2019), pp. 1-10. (Year: 2019).*

Zhang, Chen, et al. "UWSpeech: Speech to Speech Translation for Unwritten Languages." arXiv preprint arXiv:2006.07926 (2020), pp. 1-9 (Year: 2020).*

Gulati, Anmol, et al. "Conformer: Convolution-augmented transformer for speech recognition." arXiv preprint arXiv:2005.08100 (May 16, 2020), pp. 1-5 (Year: 2020).*

Lee, Ann, et al. "Direct speech-to-speech translation with discrete units." arXiv preprint arXiv:2107.05604v1 (Jul. 12, 2021), pp. 1-9 (Year: 2021).*

Shen, Jonathan, et al. "Non-attentive tacotron: Robust and controllable neural tts synthesis including unsupervised duration modeling." arXiv preprint arXiv:2010.04301v1 (May 11, 2021), pp. 1-14 (Year: 2021).*

Kano, Takatomo, et al. "Transformer-based direct speech-to-speech translation with transcoder." 2021 IEEE Spoken Language Technology Workshop (SLT). IEEE. (Mar. 25, 2021) (Year: 2021).*

Wang, Shiming, et al. "Patnet: A phoneme-level autoregressive transformer network for speech synthesis." IEEE International Conference on Acoustics, Speech and Signal Processing (ICASSP) (IEEE) (May 13, 2021), pp. 5684-5688 (Year: 2021).*

Morrison, Max, et al. "Context-aware prosody correction for text-based speech editing." IEEE International Conference on Acoustics, Speech and Signal Processing (ICASSP) (IEEE) (May 13, 2021), pp. 7038-7042 (Year: 2021).*

Ye Jia et al: "Direct speech-to-speech translation with a sequence-to-sequence model", arxiv.org, Cornell University Library, 201 Olin Library Cornell University Ithaca, NY 14853, Apr. 12, 2019 (Apr. 12, 2019).

Tjandra Andros et al: "Speech-to-Speech Translation Between Untranscribed Unknown Languages", 2019 IEEE Automatic Speech Recognition and Understanding Workshop (ASRU), IEEE, Dec. 14, 2019 (Dec. 14, 2019), pp. 593-600.

Ye Jia et al: "Translatotron 2: Robust direct speech-to-speech translation", arxiv.org, Cornell University Library, 201 Olin Library Cornell University Ithaca, NY 14853, Jul. 19, 2021 (Jul. 19, 2021).

Mar. 28, 2022 Written Opinion (WO) of the International Searching Authority (ISA) and International Search Report (ISR) issued in International Application No. PCT/US2021/063429.

Direct Speech to Speech Translation Using Machine Learning, Limbu, Dec. 2020.

Toward affective speech-to-speech translation: Strategy for emotional speech recognition and synthesis in multiple languages, Akagi et al. Feb. 16, 2015.

* cited by examiner

ROBUST DIRECT SPEECH-TO-SPEECH TRANSLATION

CROSS REFERENCE TO RELATED APPLICATIONS

This U.S. Patent Application claims priority under 35 U.S.C. § 119(e) to U.S. Provisional Application 63/203,329, filed on Jul. 16, 2021. The disclosure of this prior application is considered part of the disclosure of this application and is hereby incorporated by reference in its entirety.

TECHNICAL FIELD

This disclosure relates to robust direct speech-to-speech translation.

BACKGROUND

Speech-to-speech translation (S2ST) is highly beneficial for breaking down communication barriers between people not sharing a common language. Conventionally, S2ST systems are composed of a cascade of three components: automatic speech recognition (ASR); text-to-text machine translation (MT), and text-to-speech (TTS) synthesis. Recently, advancements in direct speech-to-text translation (ST) have outperformed the cascade of ASR and MT, thereby making a two component cascade of ST and TTS as S2ST feasible.

DESCRIPTION OF DRAWINGS

Like reference symbols in the various drawings indicate like elements.

SUMMARY

Figure 1:
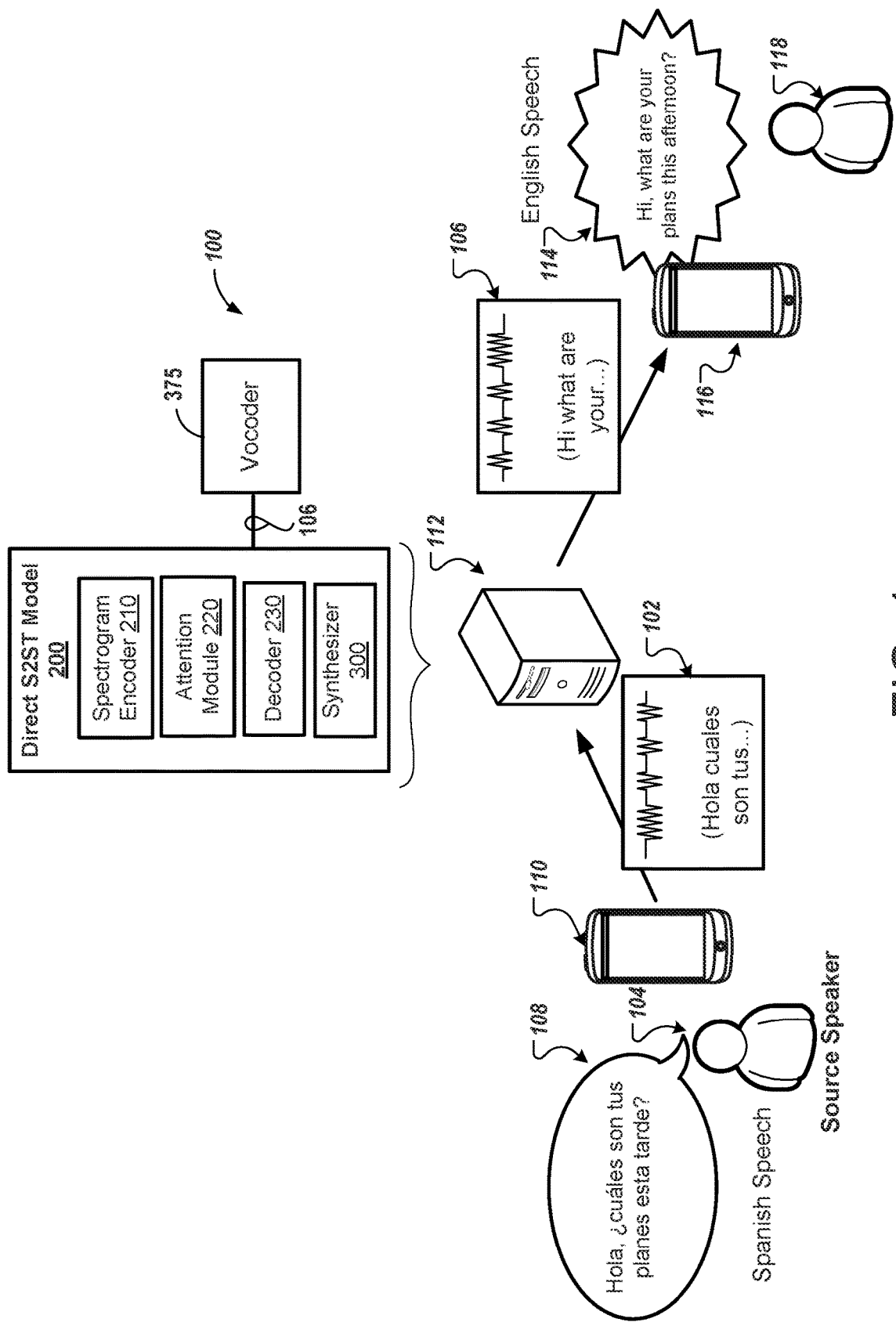
FIG. 1 is a schematic view of an example speech environment including a direct speech-to-speech translation (S2ST) model.

One aspect of the disclosure provides a direct speech-to-speech translation (S2ST) model that includes an encoder configured to receive an input speech representation that corresponds to an utterance spoken by a source speaker in a first language and encode the input speech representation into a hidden feature representation. The S2ST model also includes an attention module configured to generate a context vector that attends to the hidden representation encoded by the encoder. The S2ST model also includes a decoder configured to receive the context vector generated by the attention module and predict a phoneme representation that corresponds to a translation of the utterance in a second different language. The S2ST model also includes a synthesizer configured to receive the context vector and the phoneme representation and generate a translated synthesized speech representation corresponding to a translation of the utterance spoken in the different second language.

Implementations of the disclosure may include one or more of the following optional features. In some implementations, the encoder includes a stack of conformer blocks. In other implementations, the encoder includes a stack of one of transformer blocks or lightweight convolutional blocks. In some examples, the synthesizer includes a duration model network configured to predict a duration of each phoneme in a sequence of phonemes represented by the phoneme representation. In these examples, the synthesizer may be configured to generate the translated synthesized speech representation by upsampling the sequence of phonemes based on the predicted duration of each phoneme. The translated synthesized speech representation may be configured to a speaking style/prosody of the source speaker.

In some implementations, the S2ST model is trained on pairs of parallel source language and target language utterances each including a voice spoken in the source utterance. In these implementations, at least one of the source language utterance or the target language utterance includes speech synthesized by a text-to-speech model trained to generate synthesized speech in the voice of the source utterance. In some examples, the S2ST module further includes a vocoder configured to receive the translated synthesized speech representation and synthesize the translated synthesized speech representation into an audible output of the translated synthesized speech representation. Optionally, the phoneme representation may include a probability distribution of possible phonemes in a phoneme sequence corresponding to the translated synthesized speech representation Another aspect of the disclosure provides a computer-implemented method that when executed on data processing hardware causes the data processing hardware to perform operations for direct speech-to-speech translation. The operations include receiving, as input to a direct speech-to-speech translation (S2ST) model, an input speech representation that corresponds to an utterance spoken by a source speaker in a first language. The operations also include encoding the input speech representation into a hidden feature representation by an encoder of the S2ST model. The operation also include generating, by a decoder of the S2ST model, a context vector that attends to hidden feature representation encoded by the encoder. The operations also include receiving the context vector generated by the attention module at a decoder of the S2ST model. The operations also include predicting, by the decoder, a phoneme representation that corresponds to a translation of the utterance in a second different language. The operations also include receiving the context vector and the phoneme representation at a synthesizer of the S2ST model. The operations also include generating, by the synthesizer, a translated synthesize speech representation that corresponds to the translation of the utterance spoken in the different second language.

Implementations of the disclosure may include one or more of the following optional features. In some implementations, the encoder includes a stack of conformer blocks. In other implementations, the encoder includes a stack of one of transformer blocks or lightweight convolutional blocks. In some examples, the synthesizer includes a duration model network configured to predict a duration of each phoneme in a sequence of phonemes represented by the phoneme representation. In these examples, generating the translated synthesized speech representation may include upsampling the sequence of phonemes based on the predicted duration of each phoneme.

The translated synthesize speech representation may be configured to a speaking style/prosody of the source speaker. In some implementations, the S2ST model is trained on pairs of parallel source language and target language utterances each including a voice spoken in the source utterance. In these implementations, at least one of the source language utterance or the target language utterance may include speech synthesized by a text-to-speech model trained to generate synthesized speech in the voice of the source utterance. In some examples, the operations further include receiving the translated synthesized speech representation at a vocoder of the S2ST model and synthesizing, by the vocoder, the translated synthesized speech representation into an audible output of the translated synthesized speech representation. Optionally, the phoneme representation may include a probability distribution of possible phonemes in a phoneme sequence corresponding to the translated synthesized speech representation.

The details of one or more implementations of the disclosure are set forth in the accompanying drawings and the description below. Other aspects, features, and advantages will be apparent from the description and drawings, and from the claims.

DETAILED DESCRIPTION

Speech-to-speech translation (S2ST) is highly beneficial for breaking down communication barriers between people not sharing a common language. Conventionally, S2ST systems are composed of a cascade of three components: automatic speech recognition (ASR); text-to-text machine translation (MT), and text-to-speech (TTS) synthesis. Recently, advancements in direct speech-to-text translation (ST) have outperformed the cascade of ASR and MT, thereby making a two component cascade of ST and TTS as S2ST feasible.

Direct S2ST includes directly translating speech in one language to speech in another language. Stated differently, direct S2ST systems/models are configured to convert an input audio waveform or spectrograms corresponding to speech spoken in a first language by a human speaker directly into an output audio waveform or spectrograms corresponding to synthesized speech in a second language different than the first language without converting the input audio waveform into an intermediate representation (e.g., text or phonemes). As will become apparent, direct S2ST models, as well as techniques for training direct S2ST models, will enable a user to speak in his/her native language, and be understood by, both other humans and speech interfaces (e.g., digital assistants) by enabling recognition and/or reproduction of the user's speech as synthesized audio in a different language. A recent direct S2ST model underperformed cascaded S2ST systems in terms of translation quality, while also suffering from robustness issues of the output synthesized speech in terms of babbling and long pauses. These issues are attributed to the use of an attention-based approach for synthesizing speech.

Implementations herein are directed toward a robust direct S2ST model that is trained end-to-end, outperforms existing direct S2ST systems, and is comparable to cascaded systems in terms of translation quality, speech naturalness, and speech robustness. Notably, compared to cascaded systems, direct S2ST systems/models have the potential of: retaining paralinguistic and non-linguistic information during the translation, such as speaker's voice and prosody; working on languages without written form; reducing computational requirements and inference latency; avoiding error compounding across sub-systems; and providing ease in the handling contents that do not need to be translated, such as names and other proper nouns. Implementations herein are further directed toward a voice retaining technique in S2ST that does not rely on any explicit speaker embedding or identifier. Specifically, the trained S2ST model is trained to only retain a voice of the source speaker that is provided in the input speech without the ability to generate speech in a voice different from the source speaker. Notably, the ability to retain the source speaker's voice is useful for production environments by proactively mitigating misuse for creating spoofing audio artifacts.

FIG. 1 shows a speech conversion environment 100 that employs a direct speech-to-speech translation (S2ST) model 200 configured to translate input utterances spoken by a source speaker in a first language directly into corresponding output utterances in a different second language, and vice versa. As will become apparent, the direct S2ST model 200 is trained end-to-end. Notably, the direct S2ST model 200 is distinct from a cascaded S2ST system that employs a separate combination of an automated speech recognizer (ASR) component, a text-to-text machine translation (MT) component, and text-to-speech (TTS) synthesis component, or other cascaded S2ST systems that employ a cascade of a direct speech-to-text translation (ST) component followed by a TTS component.

In the example shown, the direct S2ST model 200 is configured to convert input audio data 102 corresponding to an utterance 108 spoken in a first/source language (e.g., Spanish) by a source speaker 104 into output audio data (e.g., mel-spectrogram) 106 corresponding to a translated synthesized speech representation of a translated utterance 114 spoken in a different second language (e.g., English) by the source speaker 104. The direct S2ST model 200 may convert an input spectrogram corresponding to the input audio data 102 directly into an output spectrogram corresponding to the output audio data 102 without performing speech recognition and text-to-text machine translation, or otherwise without requiring the generation of any intermediate discrete representations (e.g., text or phonemes) from the input data 102. While described in greater detail with reference to FIGS. 2 and 3, the direct S2ST model 200 includes a spectrogram encoder 210, an attention module 220, a decoder 230, and a synthesizer (e.g., a spectrogram decoder) 300.

A vocoder 375 may synthesize the output audio data 106 output from the direct S2ST model 200 into a time-domain waveform for audible output as the translated utterance 114 spoken in the second language and in the voice of the source speaker. A time-domain audio waveform includes an audio waveform that defines an amplitude of an audio signal over time. The lieu of a vocoder 375, a unit selection module or a WaveNet module may instead synthesize the output audio data 106 into time-domain waveforms of synthesized speech in the translated second language and in the voice of the source speaker 104. In some implementations, the vocoder 375 includes a vocoder network, i.e., neural vocoder, which is separately trained and conditioned on mel-frequency spectrograms for conversion into time-domain audio waveforms.

In the example shown, the source speaker 104 is a native speaker of the first/source language of Spanish. The direct S2ST 200 is accordingly trained to covert the input audio data 102 corresponding to utterances 108 spoken by the source speaker 104 in Spanish directly into the output audio data 106 corresponding to the translated synthesized speech representation corresponding to a translated utterance 114 in English (e.g., second/target language). That is, the translated utterance 114 in English (e.g., "Hi, what are your plans this afternoon?) includes synthesized audio for a translated version of the input utterance 108 that was spoken by the source speaker 104 in Spanish (e.g., "Hola, cuales son tus planes esta tarde?"). Thus, the translated synthesized representation provided by the output audio data 106 in English allows the native Spanish speaker to convey the utterance 108 spoken in Spanish to a recipient user 118 that natively speaks English. In some examples, the source speaker 104 does not speak English and the recipient speaker 118 does not speak/understand Spanish. In some implementations, the direct S2ST model 200 is a multilingual and trained to also convert input utterances spoken in English by speaker 118 into translated utterances in Spanish. In these implementations, the direct S2ST model 200 may be configured to convert speech between one or more other pairs of languages in addition to, or in lieu of, Spanish and English.

Notably, the direct S2ST model 200 is trained to retain voice characteristics of the source speaker such that the output audio data 106 corresponding to the synthesized speech representation and resulting translated utterance 114 conveys the voice of the source speaker, but in the different second language. Put another way, the translated utterance 114 conveys the voice characteristics of the source speaker 104 (e.g., speaking style/prosody) as the source speaker 104 would actually speak the different second language. In some examples, and described in greater detail below, the direct S2ST model 200 is trained to not only retain the voice characteristics of the source speaker in output audio data 106, but also prevent the ability to generate speech in a voice different from the source speaker to mitigate misuse of the model 200 for creating spoofing audio artifacts.

A computing device associated with the source speaker 104 may capture the utterance 108 spoken by the source speaker 104 in the source/first language (e.g., Spanish) and transmit the corresponding input audio data 102 to the direct S2ST model 200 for conversion into the output audio data 106. Thereafter, the direct S2ST model 200 may transmit the output audio data 106 corresponding to the translated synthesized speech representation of the translated utterance 114 to another computing device 116 associated with recipient user 118, whereby the other computing device 116 audibly outputs the translated synthesized speech representation as the translated utterance 114 in the different second language (e.g., English). In this example, the source speaker 104 and the user 118 are speaking with each other through their respective computing devices 110, 116, such as over an audio/video call (e.g., video meeting/chat) telephone call or other type of voice communication protocol, for example, voice over internet protocol.

Notably, the direct S2ST model 200 may be trained to retain the same speaking style/prosody in the output audio data 106 corresponding to the translated synthesized speech representation that was used in the input audio data 102 corresponding to the utterance 108 spoken by the source speaker 104. For instance, in the example shown, since the input audio data 102 for the Spanish utterance 108 conveys a style/prosody associated with the speaking of a question, the S2ST model 200 generates the output audio data 106 corresponding to the translated synthesized speech representation having the style/prosody associated with the speaking of the question.

In some other examples, the S2ST conversion model 200 instead sends the output audio data 106 corresponding to the translated synthesized speech representation of the utterance spoken by the source speaker 104 to an output audio device for audibly outputting the translated synthesized speech representation in the voice of the source speaker 104 to an audience. For instance, the source speaker 104 who natively speaks Spanish may be a lecturer providing a lecture to an English speaking audience, in which utterances spoken by the source speaker 104 in Spanish are converted into translated synthesized speech representations audibly output from the audio device to the English speaking audience as translated utterances in English.

Alternatively, the other computing device 116 may be associated with a down-stream automated speech recognition (ASR) system in which the S2ST model 200 functions as a front-end to provide the output audio data 106 corresponding to the synthesized speech representation as an input to the ASR system for conversion into recognized text. The recognized text could be presented to the other user 118 and/or could be provided to a natural language understanding (NLU) system for further processing.

The functionality of the S2ST model 200 can reside on a remote server 112, on either or both of the computing devices 110, 116, or any combination of the remote server and computing devices 110, 116. In particular, data processing hardware of the computing devices 110, 116 may execute the S2ST model 200. In some implementations, the S2ST model 200 continuously generates output audio data 106 corresponding to synthesized speech representations of an utterance as the source speaker 104 speaks corresponding portions of the utterance in a first/source language. By continuously generating output audio data 106 corresponding to synthesized speech representations of portions of the utterance 108 spoken by the source speaker 104, the conversation between the source speaker 104 and the user 118 (or audience) may be more naturally paced. In some additional implementations, the S2ST model 200 waits to determine/detect when the source speaker 104 stops speaking, using techniques such as voice activity detection, end pointing, end of query detection, etc., before converting the corresponding input audio data 102 of the utterance 108 in the first language into the corresponding output audio data 106 corresponding to the translated synthesized speech representation of the same utterance 114, but in the different second language.

Figure 2:
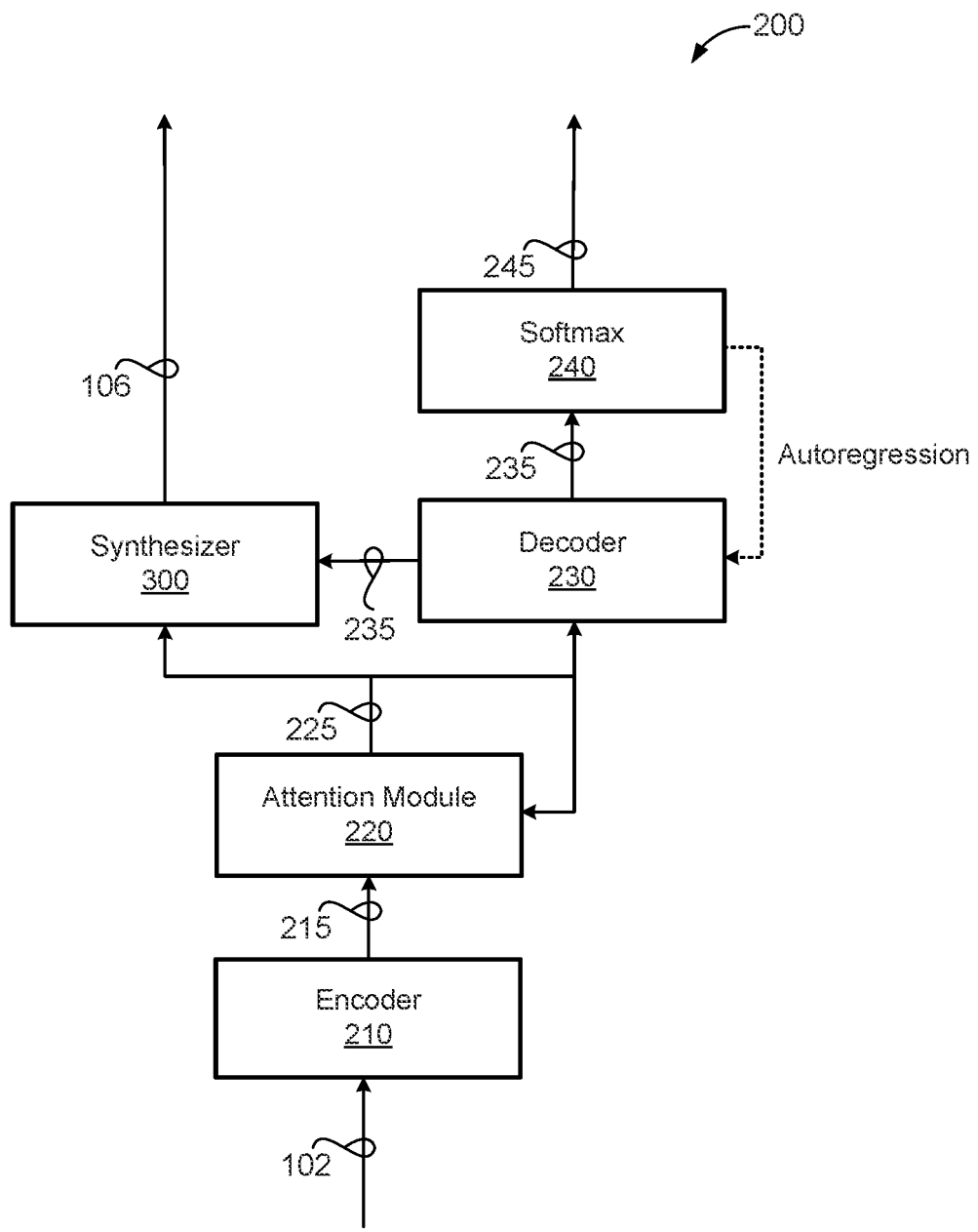
FIG. 2 is a schematic view of the S2ST model.
Figure 4:
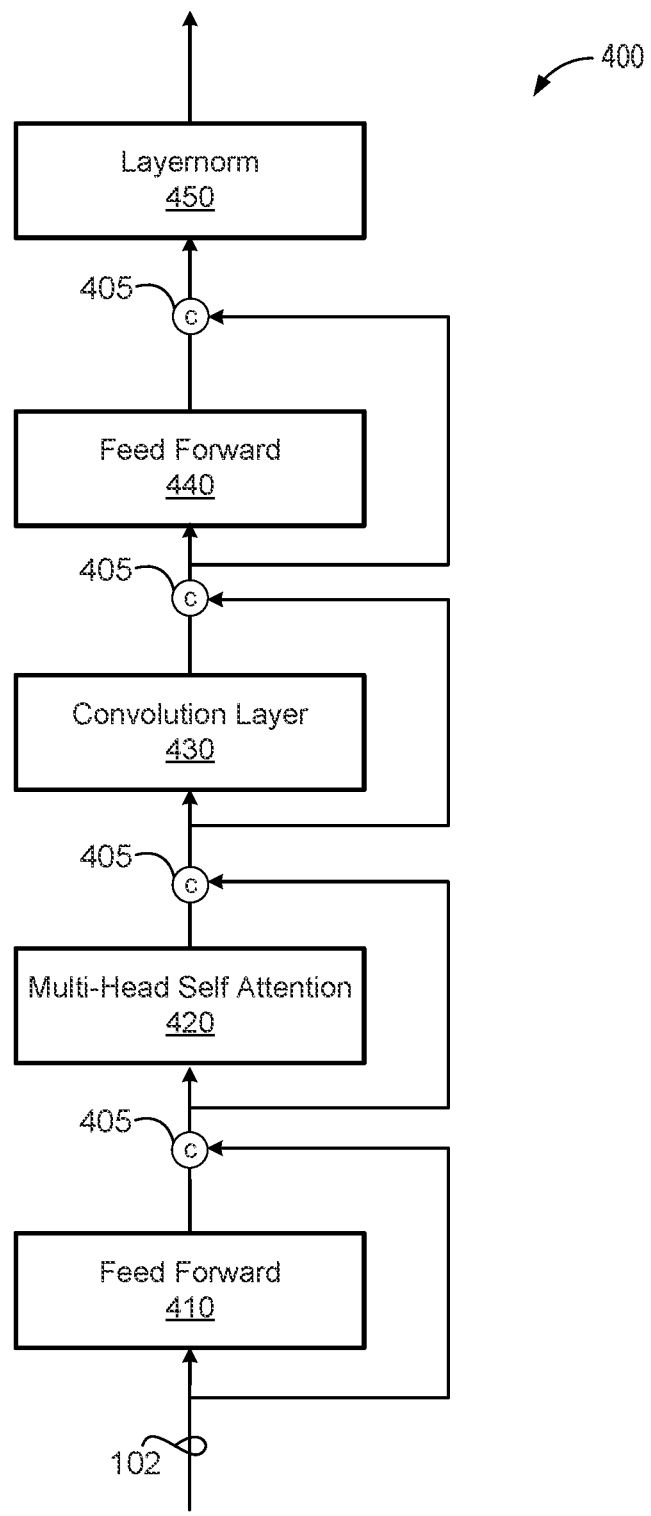
FIG. 4 is a schematic view of an example Conformer block.

FIG. 2 shows the direct S2ST model 200 of FIG. 1 including the encoder 210, attention module 220, decoder 230, and synthesizer 300. The encoder 210 is configured to encode the input audio data 102 into a hidden feature representation (e.g., a series of vectors) 215. Here, the input audio data 102 includes a sequence of input spectrograms that correspond to the utterance 108 spoken by the source speaker 104 in the source/first language (e.g., Spanish). The sequence of input phonemes may include an 80-channel mel-spectrogram sequence. In some implementations, the encoder 210 includes a stack of Conformer layers. In these implementations, the encoder subsamples the input audio data 102 including the input mel-spectrogram sequence using a convolutional layer, and then processes the input mel-spectrogram sequence with the stack of Conformer blocks. Each Conformer block may include a feed-forward layer, a self-attention layer, a convolution layer, and a second feed-forward layer. In some examples, the stack of Conformer blocks includes 16 layers of Conformer blocks with a dimension of 144, and a subsampling factor of four (4). FIG. 4 provides a schematic view of an example Conformer block. The encoder 210 may instead use a stack of transformer blocks or lightweight convolutional blocks in lieu of Conformer blocks.

The attention module 220 is configured to generate a context vector 225 that attends to the hidden feature representation 215 encoded by the encoder 210. The attention module 220 may include a multi-headed attention mechanism. The decoder 230 is configured to receive, as input, the context vector 225 indicating the hidden feature representation 215 as source values for attention, and predict, as output, a phoneme representation 235 representing a probability distribution of possible phonemes in a phoneme sequence 245 corresponding to the audio data (e.g., target translated synthesized speech representation) 106. That is, the phoneme representation 235 corresponds to a translation of the utterance 108 in a second different utterance (e.g., in the second language). A fully-connected network plus softmax 240 layer may select, at each of a plurality of output steps, a phoneme in the sequence of phonemes 245 (e.g., English phonemes) based on using the phoneme with the highest probability in the probability distribution of possible phonemes represented by the phoneme representation 235. In the example shown, the decoder 230 is autoregressive and generates, at each output step, the probability distribution of possible phonemes for the given output step based on each previous phoneme in the phoneme sequence 245 selected by the Softmax 240 during each of the previous output steps. In some implementations, the decoder 230 includes a stack of long short-term memory (LSTM) cells assisted by the attention module 220. Notably, the combination of the encoder 210, attention module 220, and decoder 230 is similar to a direct speech-to-text translation (ST) component typically found in a cascaded S2ST system.

The synthesizer 300 receives, as input during each of a plurality of output steps, a concatenation of the phoneme representation 235 (or phoneme sequence 245) and the context vector 225 at the corresponding output step and generates, as output at each of the plurality of output steps, the output audio data 106 corresponding to the translated synthesized speech representation in the target/second language and in the voice of the source speaker 104. Alternatively, the synthesizer 300 may receive the phoneme representation 235 and the context vector 225 (e.g., without any concatenation). The synthesizer 300 may also be referred to as a spectrogram decoder. In some examples, the synthesizer is autoregressive where each output spectrogram predicted is based on the sequence of previously predicted spectrograms. In other examples, the synthesizer 300 is parallel and non-autoregressive.

Figure 3:
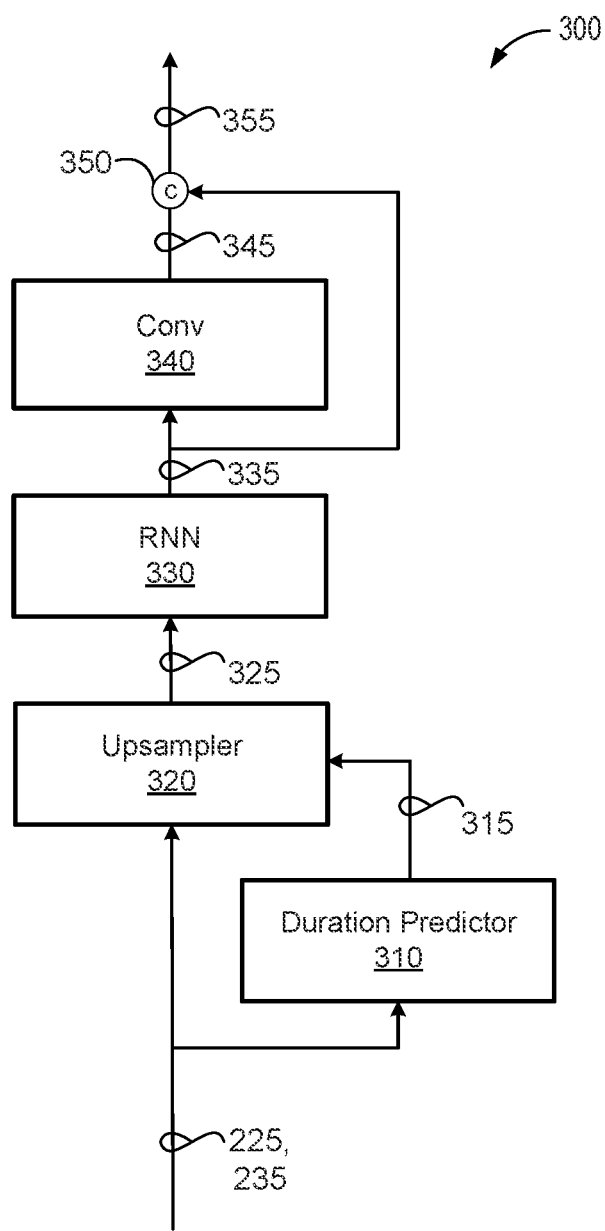
FIG. 3 is a schematic view of a synthesizer of the S2ST model.

FIG. 3 provides an example of the synthesizer 300 of FIG. 1. Here, the synthesizer 300 may include a phoneme duration modeling network (i.e., duration predictor) 310, and upsampler module 320, a recurrent neural network (RNN) 330, and a convolutional layer 340. The duration modeling network receives the phoneme representation 235 from the decoder 230 and the context vector 224 from the attention module 220 as input. Moreover, the duration modeling network 310 is tasked with predicting a duration 315 for each phoneme in the phoneme representation 235 corresponding to the output audio data 106 that represents the translated synthesized speech representation in the target/second language. During training, an individual target duration 315 for each phoneme is unknown, thus, the duration model network 310 determines a target average duration based on a proportion of the T total frame duration of an entire reference mel-frequency spectrogram sequence and K total number of phonemes (e.g., tokens) in a reference phoneme sequence corresponding to the reference mel-frequency spectrogram sequence. That is, the target average duration is the average duration for all phonemes using the reference mel-frequency spectrogram sequence and the reference phoneme sequence used during training. During training, a loss term (e.g., L2 loss term) is then determined between the predicted phoneme durations and the target average duration. As such, the duration model network 310 learns to predict phoneme durations in an unsupervised manner without the use of supervised phoneme duration labels provided from an external aligner. While external aligners are capable of providing reasonable alignments between phonemes and mel-spectral frames, phoneme duration rounding is required by a length regulator to upsample phonemes in the reference phoneme sequence according to their duration which leads to rounding errors that may persist. In some instances, using supervised duration labels from the external aligner during training and using predicted durations during inference creates phoneme duration discrepancies between training the S2ST model 200 and inference of the S2ST model 200. Moreover, such rounding operations are not differentiable, and thus, an error gradient is unable to propagate through the duration model network.

The upsampler 320 receives the predicted durations 315, the context vector 225, and the phoneme representations as input and generates an output 235. In particular, the upsampler 320 is configured to upsample the input sequence (e.g., the phoneme representation 235 or the phoneme sequence 245) based on the predicted durations 315 from the duration model network 315. The RNN 330 receives the output 335 and is configured to predict the target mel-spectrogram 335 autoregressively, which corresponds to the audio data 106 (e.g., the target translated synthesized speech representation in the target/second language). The RNN 330 provides the target mel-spectrograph 335 to the convolutional layer 340 and a concatenator 350. The convolutional layer 340 provides a residual convolutional post-net configured to further refine the target mel-spectrogram 335 and generate an output 345. That is, the convolutional layer 340 further refines the predicted translated synthesized speech representation in the second language. The concatenator 350 concatenates the output 345 and the target mel-spectrogram 335 to generate a translated synthesized speech representation 355 that corresponds to a translation of the utterance 108 spoken in the different second language. As such, the translated synthesized speech representation 355 may correspond to the audio data 106 (FIG. 2). Notably, the translated synthesized speech representation 355 retains the speaking style/prosody of the source speaker 104.

Implementations herein are further directed toward voice retaining techniques that restrict the trained S2ST model 200 to retain only the source speaker's voice, without the ability to generate synthesized speech in a different speaker's voice. This technique includes training on parallel utterances with the same speaker's voice on both the input utterance in a first language and the output utterance in a second language. Since fluent bilingual speakers are not prevalent, a cross-lingual TTS model may be employed to synthesize training utterances in the target second language that include the voice of the source speaker. Thus, the S2ST model 200 may train using utterances from the source speaker 104 in the first language and the synthesized training utterances of the source speaker 104 in the target second language. The S2ST model 200 can be further be trained to retain the source speakers voice in translated synthesized speech for each source speaker during speaker turns.

FIG. 4 provides an example of a Conformer block 400 from the stack of Conformer layers of the encoder 210. The Conformer block 400 includes a first half feed-forward layer 410, a second half feed-forward layer 440, with a multi-head self attention block 420 and a convolution layer 430 disposed between the first and second half feed-forward layers 410, 440, and concatenation operators 405. The first half feed-forward layer 410 processes the input audio data 102 including the input mel-spectrogram sequence. Subsequently, the multi-head self attention block 420 receives the input audio data 102 concatenated with the output of the first half-feed forward layer 410. Intuitively, the role of the multi-head self attention block 420 is to summarize noise context separately for each input frame that is to be enhanced. A convolution layer 430 subsamples the output of the multi-head self attention block 420 concatenated with the output of the first half feed forward layer 410. Thereafter, a second half-feed forward layer 440 receives a concatenation of the convolution layer 430 output and the multi-head self attention block 420. A layer norm module 450 processes the output from the second half feed-forward layer 440. Mathematically, the conformer block 400 transforms input features x, using modulation features m, to produce output features y, as follows:

$$\hat{x} = x + r(m) \odot x + h(m). \quad (1)$$

$$\tilde{x} = \hat{x} + \frac{1}{2}FFN(\hat{x}), \tilde{n} = n + \frac{1}{2}FFN(n)$$

$$x' = \tilde{x} + Conv(\tilde{x}), n' = \tilde{n} + Conv(\tilde{n})$$

$$x'' = x' + MHCA(x', n')$$

$$x''' = x' \odot r(x'') + h(x'')$$

$$x'''' = x' + MHCA(x', x''')$$

$$y = \text{Layer Norm}\left(x'''' + \frac{1}{2}FFN(x'''')\right).$$

Figure 5:
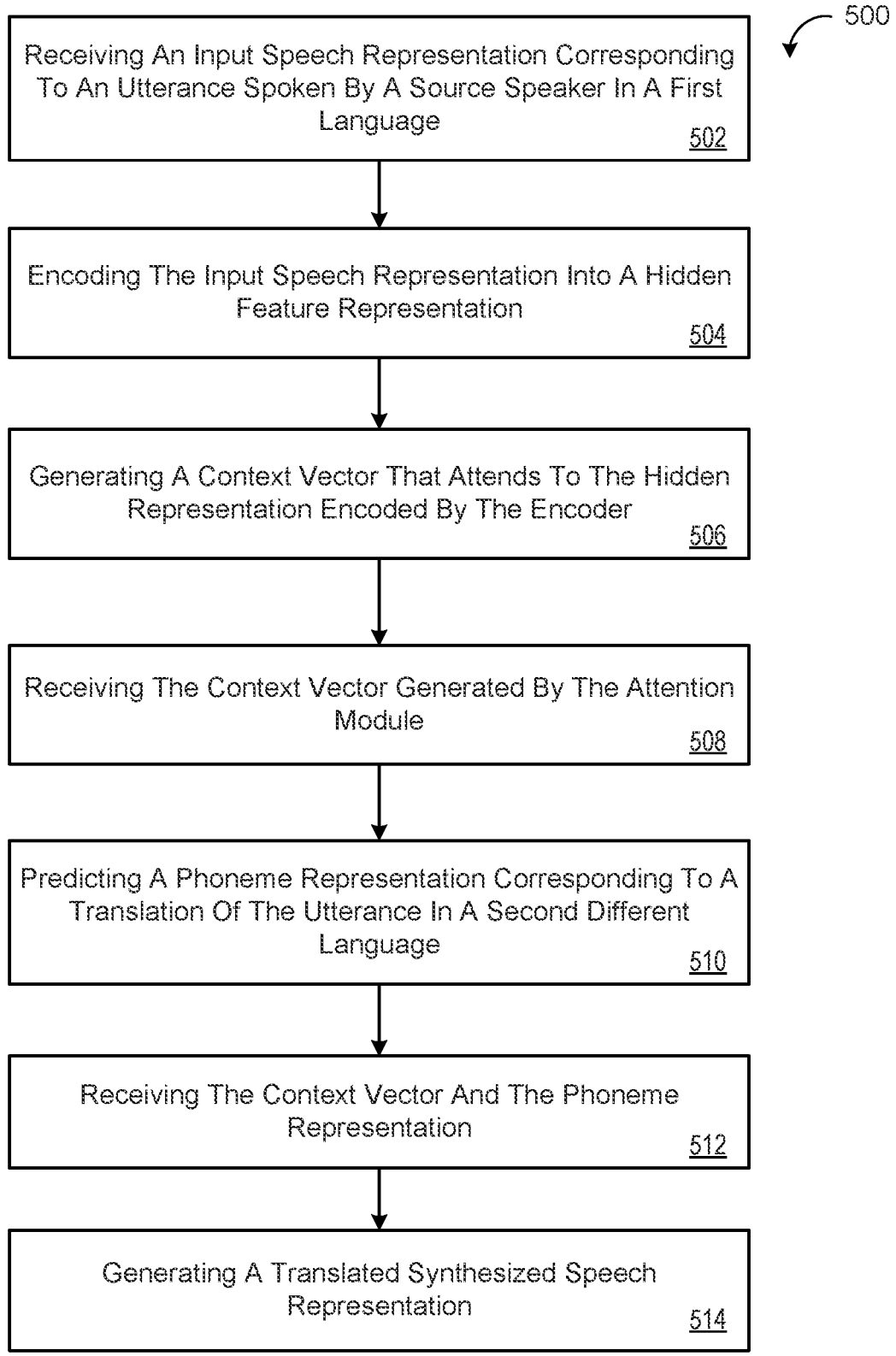
FIG. 5 is a flowchart of an example arrangement of operations for a method of performing direct speech-to-speech translation.

FIG. 5 is a flow chart of an exemplary arrangement of operations for a computer-implemented method 500 for performing direct speech-to-speech translation. At operation 502, the method 500 includes receiving an input speech representation 102 that corresponds to an utterance 108 spoken by a source speaker 104 in a first language. At operation 504, the method 500 includes an encoder 210 of the S2ST model 200 encoding the input speech representation 102 into a hidden feature representation 215. At operation 506, the method 500 includes an attention module 220 of the S2ST model 200 generating a context vector 225 that attends to the hidden feature representation 215 encoded by the encoder 210. At operation 508, the method 500 includes receiving the context vector 225 at a decoder 230 of the S2ST model 200. At operation 510, the method 500 includes the decoder 230 predicting a phoneme representation 235 corresponding to a translation of the utterance 108 in a second different language. At operation 512, the method 500 includes receiving the context vector 225 and the phoneme representation 235 at a synthesizer 300 of the S2ST model 200. At operation 514, the method 500 includes generating, by the synthesizer 300, a translated speech representation 355 corresponding to the translation of the utterance 108 spoken in the different second language.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
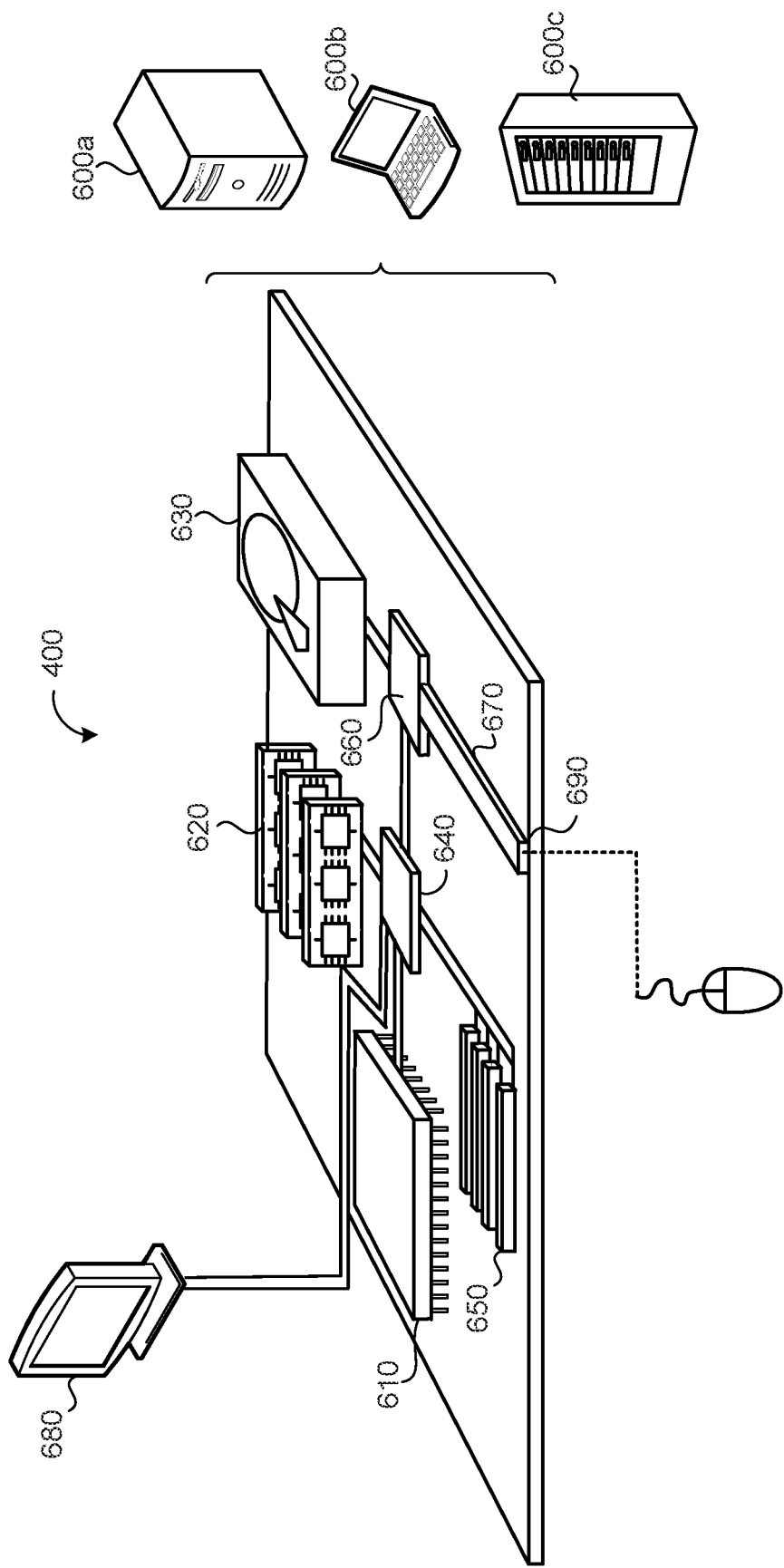
FIG. 6 is a schematic view an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A system comprising:
   data processing hardware; and
   memory hardware in communication with the data processing hardware and storing instructions that, when executed on the data processing hardware, cause the data processing hardware to execute a direct speech-to-speech translation (S2ST) model, the S2ST model comprising:
   an encoder configured to:
      receive an input speech representation corresponding to an utterance spoken by a source speaker in a first language and in a first voice; and encode the input speech representation into a hidden feature representation;

an attention module configured to generate a context vector that attends to the hidden feature representation encoded by the encoder;

a decoder configured to:
  receive the context vector generated by the attention module; and
  predict a phoneme representation corresponding to a translation of the utterance in a second different language, the phoneme representation comprising a sequence of phonemes; and a synthesizer configured to:
  receive the context vector and the phoneme representation; and
  generate a translated synthesized speech representation corresponding to the translation of the utterance spoken in the different second language and in the first voice, wherein the S2ST model is trained end-to-end on pairs of parallel source language and target language utterances each in a same voice, the S2ST model trained to not translate input speech representations corresponding to the source language utterances into corresponding translated synthesized speech representations that are in a different voice than the corresponding source language utterances.

2. The system of claim 1, wherein the encoder comprises a stack of conformer blocks.

3. The system of claim 1, wherein the encoder comprises a stack of one of transformer blocks or lightweight convolutional blocks.

4. The system of claim 1, wherein the synthesizer comprises a duration model network configured to predict a duration of each phoneme in a sequence of phonemes represented by the phoneme representation.

5. The system of claim 4, wherein the synthesizer is configured to generate the translated synthesized speech representation by upsampling the sequence of phonemes based on the predicted duration of each phoneme.

6. The system of claim 1, wherein the translated synthesized speech representation is configured to a speaking style/prosody of the source speaker.

7. The system of claim 1, wherein at least one of the source language utterance or the target language utterance comprises speech synthesized by a text-to-speech model trained to generate synthesized speech in the voice of the spoken utterance.

8. The system of claim 1, wherein a vocoder is configured to:
  receive the translated synthesized speech representation; and
  synthesize the translated synthesized speech representation into an audible output of the translated synthesized speech representation.

9. The system of claim 1, wherein the phoneme representation comprises a probability distribution of possible phonemes in a phoneme sequence corresponding to the translated synthesized speech representation.

10. A computer-implemented method when executed on data processing hardware causes the data processing hardware to perform operations comprising:
  receiving, as input to a direct speech-to-speech translation (S2ST) model, an input speech representation corresponding to an utterance spoken by a source speaker in a first language and in a first voice;
  encoding, by an encoder of the S2ST model, the input speech representation into a hidden feature representation;
  generating, by an attention module of the S2ST model, a context vector that attends to the hidden feature representation encoded by the encoder;
  receiving, at a decoder of the S2ST model, the context vector generated by the attention module;
  predicting, by the decoder, a phoneme representation corresponding to a translation of the utterance in a second different language, the phoneme representation comprising a sequence of phonemes;
  receiving, at a synthesizer of the S2ST model, the context vector and the phoneme representation; and
  generating, by the synthesizer, a translated synthesized speech representation corresponding to the translation of the utterance spoken in the different second language and in the first voice,
  wherein the S2ST model is trained end-to-end on pairs of parallel source language and target language utterances each in a same voice, the S2ST model trained to not translate input speech representations corresponding to the source language utterances into corresponding translated synthesized speech representations that are in a different voice than the corresponding source language utterances.

11. The computer-implemented method of claim 10, wherein the encoder comprises a stack of conformer blocks.

12. The computer-implemented method of claim 10, wherein the encoder comprises a stack of one of transformer blocks or lightweight convolutional blocks.

13. The computer-implemented method of claim 10, wherein the synthesizer comprises a duration model network configured to predict a duration of each phoneme in a sequence of phonemes represented by the phoneme representation.

14. The computer-implemented method of claim 13, wherein generating the translated synthesized speech representation comprises upsampling the sequence of phonemes based on the predicted duration of each phoneme.

15. The computer-implemented method of claim 10, wherein the translated synthesized speech representation is configured to a speaking style/prosody of the source speaker.

16. The computer-implemented method of claim 10, wherein at least one of the source language utterance or the target language utterance comprises speech synthesized by a text-to-speech model trained to generate synthesized speech in the voice of the source language utterance.

17. The computer-implemented method of claim 10, wherein the operations further comprise:
  receiving, at a vocoder, the translated synthesized speech representation; and
  synthesizing, by the vocoder, the translated synthesized speech representation into an audible output of the translated synthesized speech representation.

18. The computer-implemented method of claim 10, wherein the phoneme representation comprises a probability distribution of possible phonemes in a phoneme sequence corresponding to the translated synthesized speech representation.

* * * * *